United States Patent
Sangkyu et al.

(10) Patent No.: US 8,770,174 B2
(45) Date of Patent: Jul. 8, 2014

(54) METHOD AND DEVICE FOR CONTROLLING DIESEL ENGINE

(75) Inventors: Kim Sangkyu, Higashihiroshima (JP); Daisuke Shimo, Hiroshima (JP); Kyotaro Nishimoto, Hiroshima (JP); Yoshie Kakuda, Hiroshima (JP)

(73) Assignee: Mazda Motor Corporation, Hiroshima (JP)

(*) Notice: Subject to any disclaimer, the term of this patent is extended or adjusted under 35 U.S.C. 154(b) by 180 days.

(21) Appl. No.: 13/207,366

(22) Filed: Aug. 10, 2011

(65) Prior Publication Data

US 2012/0046854 A1    Feb. 23, 2012

(30) Foreign Application Priority Data

Aug. 20, 2010   (JP) .................................. 2010-185434
Apr. 14, 2011   (JP) .................................. 2011-090031

(51) Int. Cl.
*F02M 7/00*    (2006.01)

(52) U.S. Cl.
USPC ....................... 123/435; 123/568.14; 701/108

(58) Field of Classification Search
CPC ... F02B 1/12; F02D 41/0072; F02D 41/3035; F02D 41/3064; F02D 41/402; Y02T 10/44; Y02T 10/47; Y02T 10/123; Y02T 10/128; F02M 25/0752; F02D 35/02
USPC ............ 123/299, 300, 305, 478, 480, 568.12, 123/568.13, 568.21; 701/104, 105, 108; 60/602, 606.2
See application file for complete search history.

(56) References Cited

U.S. PATENT DOCUMENTS

| | | | |
|---|---|---|---|
| 5,875,743 A * | 3/1999 | Dickey ........................ 123/25 C |
| 5,943,866 A * | 8/1999 | Lovett et al. ..................... 60/737 |
| 6,024,069 A * | 2/2000 | Yoshino ......................... 123/295 |
| 6,230,683 B1 * | 5/2001 | zur Loye et al. ............... 123/435 |
| 6,247,311 B1 * | 6/2001 | Itoyama et al. .................. 60/602 |
| 6,988,365 B2 * | 1/2006 | Sasaki .......................... 60/605.2 |
| 7,237,532 B2 * | 7/2007 | Gray, Jr. ......................... 123/435 |
| 7,334,573 B2 * | 2/2008 | Shiraishi et al. .......... 123/568.14 |
| 7,461,627 B2 * | 12/2008 | Liu et al. ........................ 123/295 |
| 2005/0217649 A1 * | 10/2005 | Shimazaki et al. ...... 123/568.14 |
| 2009/0151697 A1 | 6/2009 | Hatano et al. |
| 2010/0122686 A1 * | 5/2010 | Kim et al. ..................... 123/298 |

FOREIGN PATENT DOCUMENTS

| | | |
|---|---|---|
| JP | 2008190432 A | 8/2008 |
| JP | 2009008005 A | 1/2009 |
| JP | 2009-293383 A | 12/2009 |

* cited by examiner

*Primary Examiner* — Erick Solis
*Assistant Examiner* — Carl Staubach
(74) *Attorney, Agent, or Firm* — Alleman Hall McCoy Russell & Tuttle LLP

(57) ABSTRACT

This disclosure provides a method of controlling a diesel engine. The method includes adjusting an EGR ratio according to an engine load so that a cylinder $O_2$ concentration decreases gradually to a predetermined load with an increase in the load of the engine, while the $O_2$ concentration increases gradually above the predetermined load, operating the engine in a premix combustion mode where the fuel injection is terminated before a top dead center of a compression stroke in a low load operating range including the predetermined load where the $O_2$ concentration is lowest and, after that, the fuel ignites and combusts, and operating in a diffusion combustion mode where the fuel injection is executed in parallel to the ignition and combustion of the fuel in an operating range where the load is higher than that of the operating range in the premix combustion mode and the $O_2$ concentration is relatively high.

3 Claims, 9 Drawing Sheets

METHOD AND DEVICE FOR CONTROLLING DIESEL ENGINE

BACKGROUND

The present invention relates to a method and device for controlling a diesel engine.

Diesel engines mounted in an automobile may inject fuel two or more times into cylinders during one engine cycle in order to reduce NOx and soot in exhaust gas, reduce noise and vibration, improve a fuel consumption and torque. For example, JP2009-293383A discloses a diesel engine with a turbocharger in which fuel injections are carried out at five timings. The five injections are a main injection for torque generation, and a pilot injection performed prior to the main injection in order to preheat cylinders, a pre-injection for suppressing an ignition delay of fuel due to the main injection between the pilot injection and the main injection, an after-injection for increasing an exhaust gas temperature after the main injection, and a post-injection for directly introducing fuel into an exhaust system after the after-injection and increasing a catalyst temperature.

Meanwhile, in the fuel injection mode disclosed in JP2009-293383A, the main injection injected near a top dead center of a compression stroke relates to a diffusion combustion in which an injection of fuel, and an ignition and combustion of the fuel are performed in parallel. Unlike such diffusion combustion, a premixed charge compression ignition (PCI) combustion (hereinafter, simply referred to as "premix combustion") mode is known, in which, after the injected fuel and air are fully mixed, the mixed gas is ignited and combusts near a top dead center of the compression stroke. Such a premix combustion mode suppresses generation of soot and NOx, and is utilized as a combustion mode excelling in an NVH (Noise Vibration Harshness) performance with a slow-down effect of the combustion. For example, it is performed in an operating range of comparatively low load in which a long delay time (ignition delay) from the injection of the fuel until the fuel is ignited within the cylinder can be secured.

However, when the engine load increases and a fuel injection amount is increased, the ignition delay becomes gradually shorter. Especially in an engine with a turbocharger, a supercharging volume increases with the increase in the load, and a temperature and a pressure at the end of the compression stroke rise, thereby the ignition delay further becomes shorter. As a result, the sufficiently long ignition delay cannot be secured and the premix combustion will not be established. That is, the operating range where the premix combustion mode which is advantageous for emission performance and NVH performance can be carried out is limited to a part of the range on a low-load side and, thus, it is disadvantageous because the operating range is comparatively narrow.

SUMMARY

The present invention is made in view of the above situations, and provides a control device of a diesel engine of which an operating range where a premix combustion mode can be executed is expanded to a higher load side.

According to consideration by the inventors, although the details will be described later, they have found out that, as illustrated in FIG. 7, in a predetermined operating state of the engine, when an isochronal line is drawn to connect temperature-and-pressure relations where an ignition delay of fuel becomes constant on a temperature-pressure plane having a temperature and a pressure within a cylinder (cylinder internal temperature and pressure) as parameters, the isochronal line has a reverse S-shaped curve characteristic.

Here, in a contour diagram as shown in FIG. 7, the ignition delay becomes shorter as it goes to the right and upward and, on the other hand, the ignition delay becomes longer as it goes to the left and downward. Therefore, when the cylinder internal temperature-and-pressure relation is, for example, in a range on the right side of and above the isochronal line shown by a solid line, the ignition delay becomes shorter than the ignition delay on the isochronal line. On the other hand, when the cylinder internal temperature-and-pressure relation is in a range on the left side of and below the isochronal line shown by the solid line, the ignition delay becomes longer than the ignition delay on the isochronal line.

Here, it is assumed that the ignition delay $\tau$ corresponding to the isochronal line and a fuel injection period (a pulse width P/W) are equal ($\tau$=P/W). In this assumption, when the cylinder internal temperature-and-pressure relation is in the range on the right side of and above the isochronal line shown by the solid line, since the ignition delay is shorter than the fuel injection period, the fuel ignites and combusts in the middle of fuel injection into the cylinder. That is, it will be in a combustion mode where diffusion combustion is mainly caused. On the other hand, when the cylinder internal temperature-and-pressure relation is in the range on the left side of and below the isochronal line shown by the solid line, since the ignition delay is longer than the fuel injection period, the fuel ignites and combusts after the fuel is injected into the cylinder. That is, it will be in a combustion mode where premix combustion is mainly caused.

The operating range where the premix combustion can be executed being comparatively narrow in the diesel engine corresponds to that, for example, as shown by a chain line in FIG. 7, the range on the left side of and below the isochronal line corresponding to the ignition delay $\tau$ where the premix combustion can be established being narrow. Thus, the inventors have focused on an $O_2$ concentration within the cylinder (cylinder internal $O_2$ concentration) among various parameters relating to the ignition delay in terms of expanding the range on the left side of and below the isochronal line by moving the isochronal line to the right and upward in order to expand the operating range where the premix combustion can be executed. That is, as shown by the solid line in FIG. 7, utilizing that the change in the cylinder internal $O_2$ concentration shifts the position of the isochronal line, the isochronal line is moved to the right and upward by lowering the cylinder internal $O_2$ concentration.

According to one aspect of the present invention, a diesel engine with control device is provided. This diesel engine with control device may comprise an engine unit having a geometric compression ratio that is set to 15:1 or less. The engine unit may be configured to cause compression self ignition of fuel supplied into a cylinder, and may include a fuel injection valve arranged facing to the inside of the cylinder and for directly injecting the fuel into the cylinder. The diesel engine with control device may further include an injection control module for controlling an injection mode of the fuel into the cylinder through the fuel injection valve, and an EGR ratio control system for adjusting an $O_2$ concentration within the cylinder by adjusting an EGR ratio associated with an adjustment of an EGR gas volume introduced into the cylinder.

The EGR ratio control system adjusts the EGR ratio according to the load of the engine unit so that the $O_2$ concentration within the cylinder decreases gradually to a predetermined load with an increase in the load of the engine unit, while the $O_2$ concentration increases gradually above the predetermined load. The injection control module sets to a premix combustion mode where the fuel injection is terminated before a top dead center of the compression stroke in an operating range of a low load including the predetermined load where the $O_2$ concentration within the cylinder is lowest and, after that, the fuel ignites and combusts, while the injection control module sets to a diffusion combustion mode where the fuel injection is executed in parallel to the ignition and combustion of the fuel in an operating range where the load is higher than that of the operating range in the premix combustion mode and the $O_2$ concentration within the cylinder is relatively high.

Here, the geometric compression ratio of the engine unit may be set to 12:1 to 15:1. Moreover, the EGR ratio (%) is equal to the mass of EGR gas (g)/(mass of fresh air (g)+mass of EGR gas (g)), and can be computed as follows:

EGR ratio(%)=($CO_2$ concentration in an intake passage(%)–$CO_2$ concentration of atmosphere(%))/ ($CO_2$ concentration in exhaust gas(%)–$CO_2$ concentration of atmosphere(%)).

In a conventional engine control, an EGR ratio adjusting system gradually reduces the EGR ratio (for example, linearly reduces it with an increase in the engine load) in order to raise a rate of fresh air according to the increase in the engine load. However, in the above configuration of the invention, the EGR ratio control system, for example, maintains a comparatively high EGR ratio against the increase in the load of the engine unit so that the $O_2$ concentration within the cylinder gradually decreases, down to the predetermined load. On the other hand, above the predetermined load, the EGR ratio control system linearly reduces the EGR ratio against the increase in the load of the engine unit so that the $O_2$ concentration increases gradually.

Thus, maintaining the EGR ratio high even for comparatively high loads makes the $O_2$ concentration within the cylinder low as compared with the conventional engine control, especially in low-load to middle-load ranges when the engine load range is divided into three of high, middle, and low ranges. This moves the isochronal line to the right and upward to expand the range on the left side of and below the isochronal line in the contour diagram, as described above. That is, the EGR gas contains $CO_2$ and $H_2O$ of relatively large molecular weights (large specific heats), and replacing a part of the gas that is introduced into the cylinder as the EGR gas increases a heat capacity of the gas within the cylinder and suppresses a temperature increase. This is considered to be one of the factors which makes the ignition delay of the fuel longer, in other words, shifts the isochronal line.

As a result of moving the isochronal line to the right and upward and expanding the range on the left side of and below the isochronal line, the interval between the temperature and/or pressure relation within the cylinder and the isochronal line is separated even when the temperature and/or pressure relation within the cylinder rise with the increase in the load of the engine unit. Therefore, the premix combustion mode can be executed stably. This is equivalent to expanding the range where the premix combustion mode excels in emission performance to a higher load side.

On the other hand, in a higher load range than the range where the premix combustion mode is executed, the engine unit is set to the diffusion combustion mode because it is difficult to secure the long ignition delay to stably obtain a high torque. Therefore, it becomes advantageous to improvement of fuel consumption performance.

In one embodiment, the EGR ratio control system may change the $O_2$ concentration within the cylinder by adjusting the EGR ratio through a control of a cooled EGR device for recirculating a low-temperature EGR gas to an intake passage of the engine unit.

As described above, the EGR ratio is increased and the $O_2$ concentration within the cylinder is reduced. This makes it possible to shift the isochronal line to the right and upward in the contour diagram. However, when recirculating a hot EGR gas to the intake system, for example, as shown by a white circle in the contour diagram of FIG. 7, the temperature within the cylinder becomes high. Thus, even if the isochronal line is shifted, the interval between the temperature-pressure relation within the cylinder and the isochronal line will be short. This impedes the stable premix combustion. Therefore, when the $O_2$ concentration within the cylinder is reduced to shift the isochronal line to the right and upward, it is desirable to adjust the EGR ratio by the cooled EGR device for recirculating the low-temperature EGR gas to the intake system. Here, the cooled EGR device may include a configuration where an EGR cooler is interposed in the exhaust gas recirculating passage, for example.

In one embodiment, the EGR ratio control system may include a high-pressure EGR system that branches from an exhaust passage of the engine unit, at a location upstream of a turbine of a turbocharger and recirculates the EGR gas to the intake passage of the engine unit, and a low-pressure EGR system that branches at a location downstream of the turbine and recirculates the EGR gas to the intake passage of the engine unit. The EGR ratio control system may change the $O_2$ concentration within the cylinder by adjusting the EGR ratio through a control of the low-pressure EGR system.

Since the low-pressure EGR system recirculates the EGR gas branched at a location downstream of the turbine in the exhaust passage back to the intake system, it is possible to recirculate the EGR gas at a relatively low temperature back to the intake system as compared with the high-pressure EGR system which recirculates the EGR gas branched at a location upstream of the turbine back to the intake system. Therefore, as described above, it is advantageous to stabilizing the premix combustion.

Moreover, in a diesel engine with the turbocharger, the intercooler for cooling compressed air is generally provided in the intake passage. However, the low-pressure EGR system recirculates the EGR gas back to the intake passage at a location upstream of the intercooler. For this reason, the intercooler also cools the EGR gas. This further suppresses the increase in temperature within the cylinder and lengthens the ignition delay. Therefore, it becomes more advantageous to achieving the stable premix combustion.

In one embodiment, the injection control module may execute in the diffusion combustion mode, a main injection for injecting the fuel to perform main combustion where diffusion combustion is mainly caused, and two or more pre-stage injections for injecting the fuel at a timing before the main injection to perform pre-stage combustion before the main combustion. The injection control module may control an injection mode of the pre-stage injection and an injection mode of the main injection so that a heat release rate due to the main combustion starts increasing after a heat release rate due to the pre-stage combustion reaches a peak and the heat release rate then begins to decrease.

That is, the geometric compression ratio of the engine unit is set to a comparatively low compression ratio of 15:1 or less, and the ignition delay is comparatively long also in the diffusion combustion mode where the engine load is relatively high, resulting from the temperature and pressure at the end of the compression stroke being lowered. The long ignition delay makes a slope of the heat release rate (=$dQ/d\theta$; here, Q is a quantity of heat and θ is a crank angle) by the main combustion steep. That is, combustion sound becomes larger and the NVH performance is reduced.

Therefore, in the diffusion combustion mode, two or more pre-stage injections are executed at a timing before the main injection. The pre-stage combustion is caused by the execution of the pre-stage injection, and the temperature and pressure within the cylinder (in other words, within a combustion chamber) increase. The ignition delay mainly depends on the temperature and pressure within the cylinder, and the ignition delay becomes shorter as the temperature becomes higher and the pressure becomes higher. That is, the subsequent ignition delay of the main combustion becomes shorter by increasing the temperature and pressure within the cylinder by the pre-stage injection. As a result, since the value of the heat release rate is also suppressed as the slope of the heat release rate of the main combustion does not become steep but becomes gradual. Thereby, it becomes advantageous to the improvement of NVH performance.

In particular, with the above configuration, the injection mode of the pre-stage injection and the injection mode of the main injection are set so that the rise of the heat release rate due to the main combustion begins after the heat release rate by the pre-stage combustion reaches a peak and the heat release rate begins to fall. This means that, in the graph showing the change in the heat release rate with respect to the change in the crank angle, a local minimum value occurs between a relatively low peak due to the pre-stage combustion and a relatively high peak due to the main combustion. That is, since the peak of the heat release rate due to the pre-stage combustion shifts before the start of the rise of the heat release rate due to the main combustion, the energy obtained by the pre-stage combustion increases the temperature and pressure within the cylinder at the start of the main combustion up to a state where it is sufficient to shorten the ignition delay. This makes the ignition delay shorter, as well as minimizes the injection amount of the pre-stage injection and, thereby it becomes advantageous to the improvement of the fuel consumption.

Here, the ignition delay exists not only in the main combustion but in the pre-stage combustion. The long ignition delay of the pre-stage combustion worsens the controllability of the pre-stage combustion. Especially, since the pre-stage injection is executed in a situation where the temperature and pressure within the cylinder are not so high during the compression stroke, the pre-stage combustion is more disadvantageous than the main combustion in terms of the ignition delay.

Therefore, with the above configuration, the ignition delay of the pre-stage combustion is shortened by performing the pre-stage injections two or more times. That is, the ignition delay depends not only on the temperature and pressure but also on an equivalence ratio, and the ignition delay becomes shorter as the equivalence ratio is higher. Here, the total injection amount of the pre-stage injection is determined by a quantity of heat required to create a desirable atmosphere for the main combustion (that is, desirable temperature and pressure within the cylinder). If the total injection amount required for the pre-stage injection is supplied to the cylinder by a single time of the fuel injection, the fuel will be diffused at a stretch resulted from the injection period becoming longer, and it makes the inside of the cylinder into an over-lean state. Thereby, the ignition delay of the pre-stage combustion will be longer. On the other hand, if the total injection amount required for the pre-stage injection is supplied by two or more times of fuel injections, the injection amount per injection of the pre-stage injection will decrease. Therefore, the fuel does not diffuse at a stretch. Moreover, since the two or more times of fuel injections are executed intermittently, atomized fuel injected later collides with atomized fuel injected previously, and air-fuel mixture where an equivalence ratio is locally high can be created. That is, the two or more times of the pre-stage injections create the air-fuel mixture with the locally-high equivalence ratio, and shorten the ignition delay of the pre-stage combustion. When the ignition delay of the pre-stage combustion becomes shorter, the controllability of the caused timing of the pre-stage combustion can be improved. This increases the robustness of the control for improving the NVH performance with the combination of the two or more pre-stage injections and the main injection in the diffusion combustion mode.

In one embodiment, the injection control module may execute in the diffusion combustion mode the main injection for injecting the fuel to perform main combustion where diffusion combustion is mainly caused, and two or more pre-stage injections for injecting the fuel at timings before the main injection to perform pre-stage combustion before the main combustion. The injection control module may control an injection mode of the pre-stage injection and an injection mode of the main injection so that an ignition delay from a start of the main injection until a start of the main combustion becomes 0.1 to 0.3 msec by the pre-stage combustion increasing the temperature and pressure within the cylinder.

With this configuration, similar to the above, the two or more pre-stage injections are executed at a timing before the main injection, thereby causing the pre-stage combustion. As a result, the temperature and pressure within the cylinder increase and the ignition delay due to the main combustion becomes shorter. Especially here, the injection mode of the pre-stage injection is controlled so that the ignition delay becomes 0.1 to 0.3 msec. When the ignition delay of the main combustion becomes longer than 0.3 msec, the slope of the heat release rate of the main combustion becomes steep and the NVH performance drops. On the other hand, when the ignition delay of the main combustion becomes shorter than 0.1 msec, the robustness of the control drops because the ignition delay becomes too short.

Here, in the diffusion combustion mode, the peak of the heat release rate of the pre-stage combustion may be caused before a top dead center of the compression stroke, and the main combustion may be set to begin at or near the top dead center of the compression stroke. It is advantageous in terms of the improvement of the fuel consumption as well as an improvement of an anti-misfire property to start the main combustion at or near a top dead center of the compression stroke. The shortening of the ignition delay by the pre-stage combustion described above is very effective upon accurately starting the main combustion at or near a top dead center of the compression stroke. That is, if the pre-stage combustion is caused at a timing where the peak of the heat release rate occurs before a top dead center of the compression stroke, it will be possible by performing the main injection at a suitable timing at or near a top dead center of the compression stroke to stably cause the main combustion near the top dead center of the compression stroke.

In one embodiment, the pre-stage injection may be executed at a timing where the fuel injected for every injection reaches in a cavity of the top of a piston fitted in the cylinder.

According to the above configuration, it can suppress that the injected fuel is spread out of the cavity, and can create the air-fuel mixture with a high equivalence ratio within the cavity. This is advantageous to causing the more stabilized pre-stage combustion. The phrase the "fuel reaches in a cavity" as used herein includes both a case where the atomized fuel injected from the fuel injection valve enters directly into the cavity while the piston is moving toward a top dead center of the compression stroke, and a case where, even if the atomized fuel injected from the fuel injection valve hits a lip portion or the like of the cavity and leaks outside, but the leaked atomized fuel then enters into the cavity in connection with the piston moving at or near the top dead center of the compression stroke. That is, an advance limit of the pre-stage injection is expanded for an amount of time required for the above action.

According to another aspect of the present invention, a method of controlling a diesel engine is provided. The engine has a geometric compression ratio set to 15:1 or less and the engine causes compression self ignition of fuel supplied into a cylinder.

The method includes adjusting an EGR ratio according to a load of the diesel engine so that an $O_2$ concentration within the cylinder decreases gradually to a predetermined load with an increase in the load of the diesel engine, while the $O_2$ concentration increases gradually above the predetermined load, operating the diesel engine in a premix combustion mode where the fuel injection is terminated before a top dead center of the compression stroke in an operating range of a low load including the predetermined load where the $O_2$ concentration within the cylinder is lowest and, after that, the fuel ignites and combusts, and operating in a diffusion combustion mode where the fuel injection is executed in parallel to the ignition and combustion of the fuel in an operating range where the load is higher than that of the operating range in the premix combustion mode and the $O_2$ concentration within the cylinder is relatively high.

As described above, according to the above method and device for controlling the diesel engine, the isochronal line in the contour diagram on the temperature-pressure plane moves by reducing the $O_2$ concentration within the cylinder, and the range where the premix combustion can be executed is expanded. With this knowledge, the EGR ratio is adjusted according to the load of the engine unit so that the $O_2$ concentration within the cylinder decreases gradually up to the predetermined load and the $O_2$ concentration increases gradually above the predetermined load. This can be advantageous to expanding the operating range where the premix combustion can be executed to improve the emission performance.

BRIEF DESCRIPTION OF THE DRAWINGS

FIG. 9A shows an injection mode with 8 injection holes and one injection, FIG. 9B shows an injection mode with 8 injection holes and 3 injections, and FIG. 9C shows an injection modes with 12 injection holes and 3 injections.

DESCRIPTION OF EMBODIMENT

Hereinafter, a diesel engine according to one embodiment is described referring to the accompanying drawings. Note that the following description of a desirable embodiment is essentially illustrative.

Figure 1:
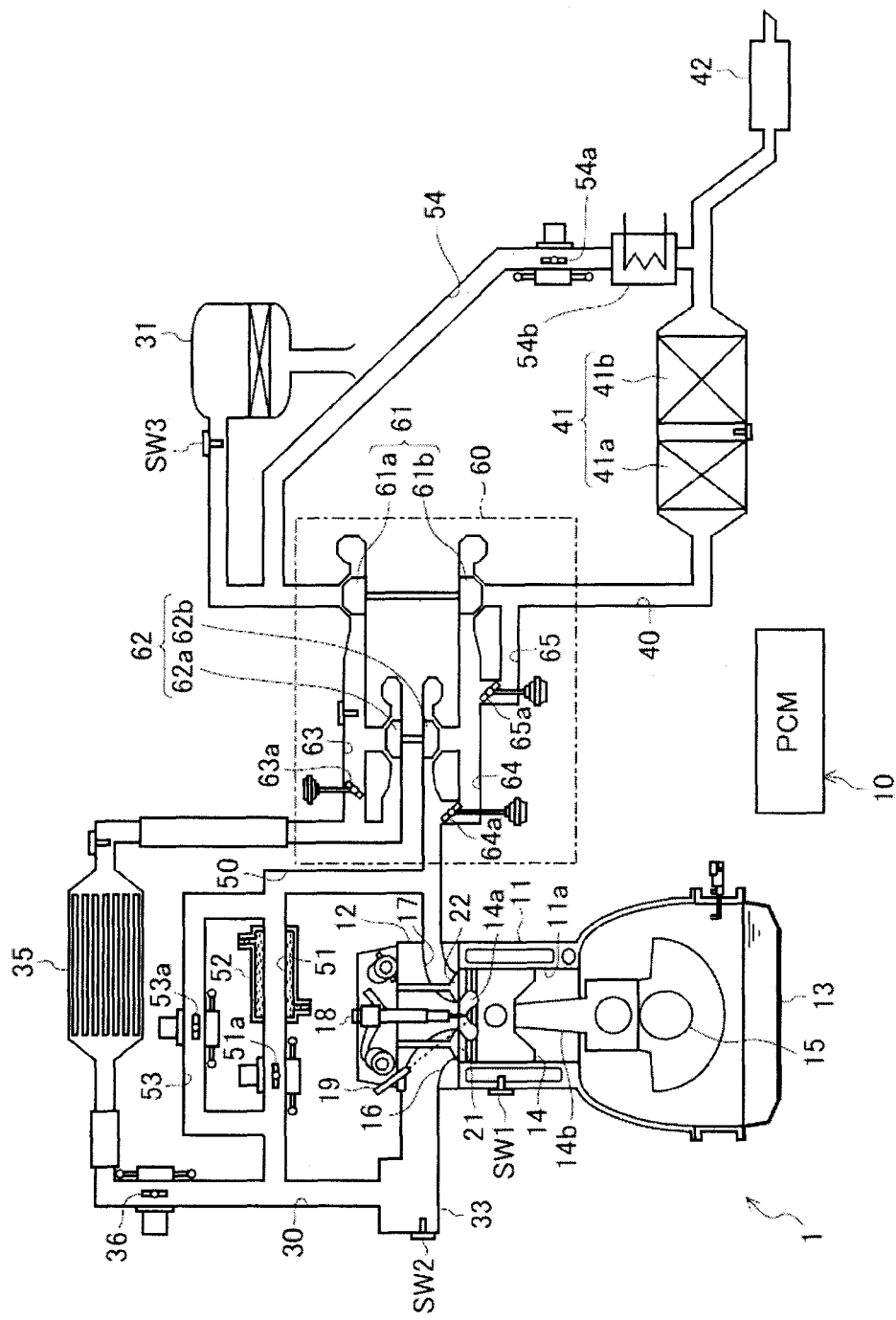
FIG. 1 is a schematic diagram showing a configuration of a diesel engine.
Figure 2:
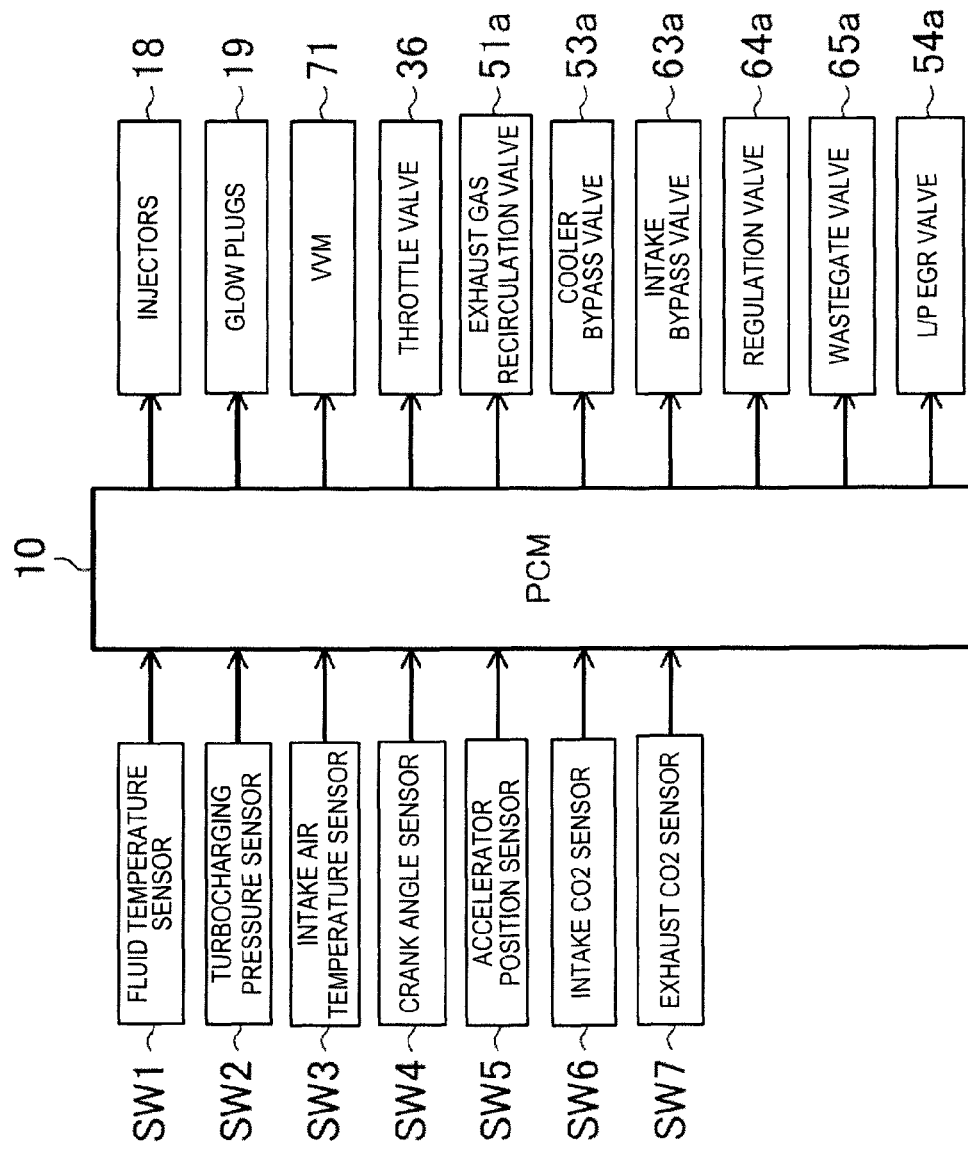
FIG. 2 is a block diagram according to a control of the diesel engine.

FIGS. 1 and 2 are schematic diagrams showing a configuration of an engine (engine unit) 1 according to this embodiment of the invention. This engine 1 is a diesel engine, to which fuel mainly containing diesel oil is supplied, and mounted in a vehicle. The engine 1 includes a cylinder block 11 provided with two or more cylinders 11a (only one is illustrated in FIG. 1), a cylinder head 12 disposed on the top of the cylinder block 11, and an oil pan 13 arranged under the cylinder block 11 to store lubricating oil or engine oil. In each cylinder 11a of the engine 1, a piston 14 is fitted in reciprocatably and a cavity which defines a reentrant-type combustion chamber 14a is formed on the top face of the piston 14. The pistons 14 are coupled to a crankshaft 15 via respective connecting rods 14b.

An intake port 16 and an exhaust port 17 are formed for each cylinder 11a in the cylinder head 12, and an intake valve 21 and an exhaust valve 22 which open and close openings of the intake port 16 and the exhaust port 17 on the side of the combustion chamber 14a are also provided.

In valve operating systems for respectively driving the intake and exhaust valves 21 and 22, a hydraulically-operating variable mechanism (refer to FIG. 2; and hereinafter, referred to as "the VVM (Variable Valve Motion)") for switching an operation mode of the exhaust valve 22 between a normal mode and a special mode is provided on the exhaust valve side. Although an illustration of its detailed configuration is omitted, the VVM 71 is constructed including two kinds of different cam profiles (a first cam having one cam peak and a second cam having two cam peaks), and a lost-motion mechanism for selectively transmitting an operating state of one of the first and second cams to the exhaust valves. When transmitting the operating state of the first cam to the exhaust valve 22, the exhaust valve 22 is operated in the normal mode where the exhaust valve 22 is opened only once during exhaust stroke. On the other hand, when transmitting the operating state of the second cam to the exhaust valve 22, the exhaust valve 22 is operated in the special mode where the exhaust valve 22 performs "two-times opening for exhaust" in which the valve is opened during the intake stroke while the valve is opened also during the exhaust stroke.

The switching between the normal mode and the special mode of the VVM 71 is performed hydraulically with oil supplied from a hydraulic pump (not illustrated) driven by the engine, and the special mode is used upon a control according to internal EGR. Note that an electromagnetically-driven valve operating system, which drives the exhaust valve 22 by an electromagnetic actuator in order to enable such a switching operation between the normal mode and the special mode, may also be adopted. Moreover, as for the execution of the internal EGR, it is limited to the "two-times opening for exhaust." For example, the internal EGR control may be performed by "two-times opening for intake" where the intake valves 21 are opened twice. Alternatively, the internal EGR control may be performed by causing combusted gas to reside by preparing a negative overlap period in which both the intake valves 21 and the exhaust valves 22 are closed during exhaust stroke or intake stroke. Note that the internal EGR control by the VVM 71 is performed during a cold start of the engine 1 where mainly an ignitability of the fuel is low.

In the cylinder head 12, injectors 18 for injecting the fuel, and glow plugs 19 for heating intake air inside the respective cylinders 11a during the cold start of the engine 1 to improve the ignitability of the fuel, are provided. Each injector 18 is disposed so that a fuel injection opening thereof faces a combustion chamber 14a from a ceiling surface of the combustion chamber 14a, respectively. The injector 18 directly injects and supplies the fuel into the combustion chamber 14a fundamentally at or near a top dead center of the compression stroke.

An intake passage 30 is connected with one side face of the engine 1 so that it communicates with the intake port 16 of each cylinder 11a. On the other hand, an exhaust passage 40 for discharging the combusted gas (exhaust gas) from the combustion chamber 14a of each cylinder 11a is connected with the other side face of the engine 1. Although described later in detail, a large-sized turbocharger 61 and a small-sized turbocharger 62 for supercharging the intake air are disposed in the intake passage 30 and the exhaust passage 40.

An air cleaner 31 which filters the intake air is disposed in an upstream end portion of the intake passage 30. On the other hand, a surge tank 33 is disposed near the downstream end in the intake passage 30. A portion of the intake passage 30 downstream of the surge tank 33 is formed into an independent passage which branches to each cylinder 11a, and the downstream end of each of the independent passages is connected with the intake port 16 of each cylinder 11a.

Between the air cleaner 31 and the surge tank 33 in the intake passage 30, compressors 61a and 62a of the large-sized and small-sized turbochargers 61 and 62, respectively, an intercooler 35 for cooling air which is compressed by the compressors 61a and 62a, and a throttle valve 36 for adjusting an intake air amount to the combustion chamber 14a of each cylinder 11a, are disposed. The throttle valve 36 is fundamentally in a fully-open state; but it can be made into a fully-closed state so that a shock will not be caused when stopping the engine 1.

An upstream portion of the exhaust passage 40 is constructed as an exhaust manifold having the independent passages which branch to each cylinder 11a and are connected with outside ends of the exhaust ports 17, and a collective part in which these independent passages gather.

In a portion of the exhaust passage 40 downstream of the exhaust manifold, a turbine 62b of the small-sized turbocharger 62, a turbine 61b of the large-sized turbocharger 61, an exhaust gas purifying device 41 for purifying hazardous components in the exhaust gas, and a silencer 42, are disposed sequentially from upstream side.

The exhaust gas purifying device 41 has an oxidation catalyst 41a and a diesel particulate filter (hereinafter, referred to as "the filter") 41b, and they are allocated sequentially in this order from upstream side. The oxidation catalyst 41a and the filter 41b are accommodated in a single case. The oxidation catalyst 41a has an oxidation catalyst which supports platinum or palladium added to platinum, and urges a reaction for generating $CO_2$ and $H_2O$ by oxidizing CO and HC in the exhaust gas. Moreover, the filter 41b captures particulates such as soot contained in the exhaust gas from the engine 1. Note that the filter 41b may be coated with an oxidation catalyst.

A portion of the intake passage 30 between the surge tank 33 and the throttle valve 36 (that is, a portion downstream of the small-sized compressor 62a of the small-sized turbocharger 62) and a portion of the exhaust passage 40 between the exhaust manifold and the small-sized turbine 62b of the small-sized turbocharger 62 (that is, a portion upstream of the small-sized turbine 62b of the small-sized turbocharger 62) are connected with each other through an exhaust gas recirculating passage 50 for recirculating a part of the exhaust gas to the intake passage 30 (a high-pressure EGR system). The exhaust gas recirculating passage 50 is constructed including a main passage 51 where an exhaust gas recirculation valve 51a for adjusting a recirculating amount of the exhaust gas to the intake passage 30 and an EGR cooler 52 for cooling the exhaust gas with engine cooling water (coolant) are disposed, and a cooler bypass passage 53 for bypassing the EGR cooler 52. A cooler bypass valve 53a for adjusting a flow rate of the exhaust gas flowing in the cooler bypass passage 53 is disposed in the cooler bypass passage 53.

Apart from the high-pressure EGR system, a portion of the intake passage 30 upstream of the large-sized compressor 61a of the large-sized turbocharger 61 and a portion of the exhaust passage 40 downstream of the filter 41b are connected with each other through an exhaust gas recirculating passage 54 for recirculating a part of the exhaust gas to the intake passage 30, as a low-pressure EGR system. The exhaust gas recirculating passage 54 is constructed by disposing therein a L/P (Low Pressure) EGR valve 54a for adjusting a recirculating amount of the exhaust gas to the intake passage 30 and an EGR cooler 54b for cooling the exhaust gas.

The large-sized turbocharger 61 has a large-sized compressor 61a disposed in the intake passage 30 and a large-sized turbine 61b disposed in the exhaust passage 40. The large-sized compressor 61a is disposed between the air cleaner 31 and the intercooler 35 in the intake passage 30. On the other hand, the large-sized turbine 61b is disposed between the exhaust manifold and the oxidation catalyst 41a in the exhaust passage 40.

The small-sized turbocharger 62 has a small-sized compressor 62a disposed in the intake passage 30 and a small-sized turbine 62b disposed in the exhaust passage 40. The small-sized compressor 62a is disposed downstream of the large-sized compressor 61a in the intake passage 30. On the other hand, the small-sized turbine 62b is disposed upstream of the large-sized turbine 61b in the exhaust passage 40.

That is, in the intake passage 30, the large-sized compressor 61a and the small-sized compressor 62a are disposed in series sequentially from the upstream side, and in the exhaust passage 40, the small-sized turbine 62b and the large-sized turbine 61b are disposed in series sequentially from the upstream side. The large-sized and small-sized turbines 61b and 62b are rotated by the flow of the exhaust gas and, by the rotation of the large-sized and small-sized turbines 61b and 62b, the large-sized and small-sized compressors 61a and 62a which are coupled to the large-sized and small-sized turbines 61*b* and 62*b* operate, respectively.

The small-sized turbocharger 62 is relatively small and the large-sized turbocharger 61 is relatively large. That is, the large-sized turbine 61*b* of the large-sized turbocharger 61 has a larger inertia than the small-sized turbine 62*b* of the small-sized turbocharger 62.

A small-sized intake bypass passage 63 which bypasses the small-sized compressor 62*a* is connected with the intake passage 30. A small-sized intake bypass valve 63*a* for adjusting an amount of air which flows into the small-sized intake bypass passage 63 is disposed in the small-sized intake bypass passage 63. The small-sized intake bypass valve 63*a* is constructed so that it becomes in a fully-closed state (that is, normally closed) when no power is supplied.

On the other hand, a small-sized exhaust bypass passage 64 which bypasses the small-sized turbine 62*b* and a large-sized exhaust bypass passage 65 which bypasses the large-sized turbine 61*b* are connected with the exhaust passage 40. In the small-sized exhaust bypass passage 64, a regulation valve 64*a* for adjusting an amount of exhaust gas which flows into the small-sized exhaust bypass passage 64 is disposed and, in the large-sized exhaust bypass passage 65, a wastegate valve 65*a* for adjusting the amount of exhaust gas which flows into the large-sized exhaust bypass passage 65 is disposed. Both the regulation valve 64*a* and the wastegate valve 65*a* are constructed so that they are in a fully-open state (that is, normally opened) when no power is supplied.

The large-sized turbocharger 61 and the small-sized turbocharger 62, including the portions of the intake passage 30 and the exhaust passage 40 where the turbochargers are disposed, are integrated as a unit to constitute a supercharger unit 60. The supercharger unit 60 is attached to the engine 1.

The diesel engine 1 thus constructed is controlled by a power-train control module (hereinafter, referred to as "the PCM") 10. The PCM 10 is constructed including a CPU, a memory, a group of counter timers, an interface, and a microprocessor having a path connecting these components. The PCM 10 constitutes the control device. As shown in FIG. 2, the PCM 10 is inputted with detection signals from a fluid temperature sensor SW1 for detecting a temperature of the engine cooling water, a turbocharging pressure sensor SW2 attached to the surge tank 33 and for detecting a pressure of air supplied to the combustion chamber 14*a*, an intake air temperature sensor SW3 for detecting a temperature of intake air, a crank angle sensor SW4 for detecting a rotation angle of the crankshaft 15, an accelerator position sensor SW5 for detecting an accelerator position corresponding to an operating amount of an accelerator pedal (not illustrated) of the vehicle, an intake $CO_2$ sensor SW6 for detecting a concentration of carbon dioxide in intake air, and an exhaust $CO_2$ sensor SW7 for detecting a concentration of carbon dioxide in exhaust gas. The PCM 10 determines a state of the engine 1 or the vehicle by performing various operations based on the detection signals. According to this determination, the PCM 10 outputs control signals to the injectors 18, the glow plugs 19, the VVM 71 of the valve operating system, and the actuators of various kinds of valves 36, 51*a*, 53*a*, 54*a*, 63*a*, 64*a*, and 65*a*.

The engine 1 is constructed to have a comparatively low compression ratio so that its geometric compression ratio is 12:1 or more and 15:1 or less (for example, 14:1). Thereby, an exhaust emission performance and a thermal efficiency of the engine are improved.

(Outline of Engine Combustion Control)

A fundamental control of the engine 1 by the PCM 10 determines a target torque (in other words, a target load) mainly based on an accelerator position, and achieves an injection amount, an injection timing and the like of the fuel corresponding to the target torque by an operation control of the injectors 18. The target torque is set larger as the accelerator position becomes larger and the engine speed becomes higher. The injection amount of the fuel is set based on the target torque and the engine speed. The injection amount is set larger as the target torque becomes higher and the engine speed becomes higher. Moreover, a control of the openings of the throttle valve 36, the exhaust gas recirculation valve 51*a*, and the L/P EGR valve 54*a* (that is, the external EGR control) and a control of the VVM 71 (that is, the internal EGR control) controls a recirculating rate of the exhaust gas into the cylinder 11*a* (that is, the EGR ratio).

Figure 3A:
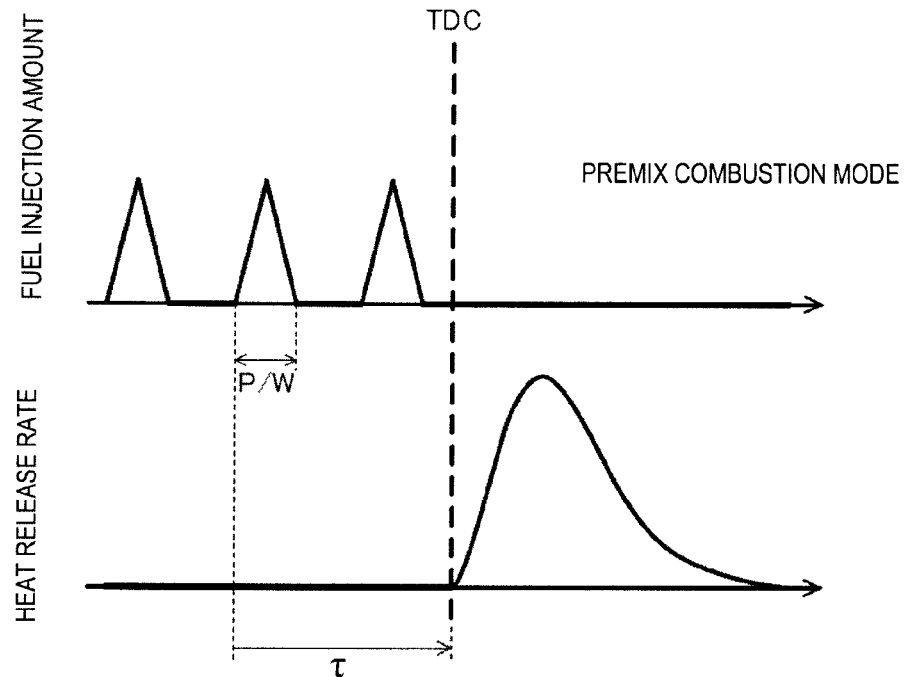
FIG. 3A is a chart showing an example of a fuel injection mode in a premix combustion mode and an example of a history of a heat release rate associated with the injection mode.
Figure 3B:
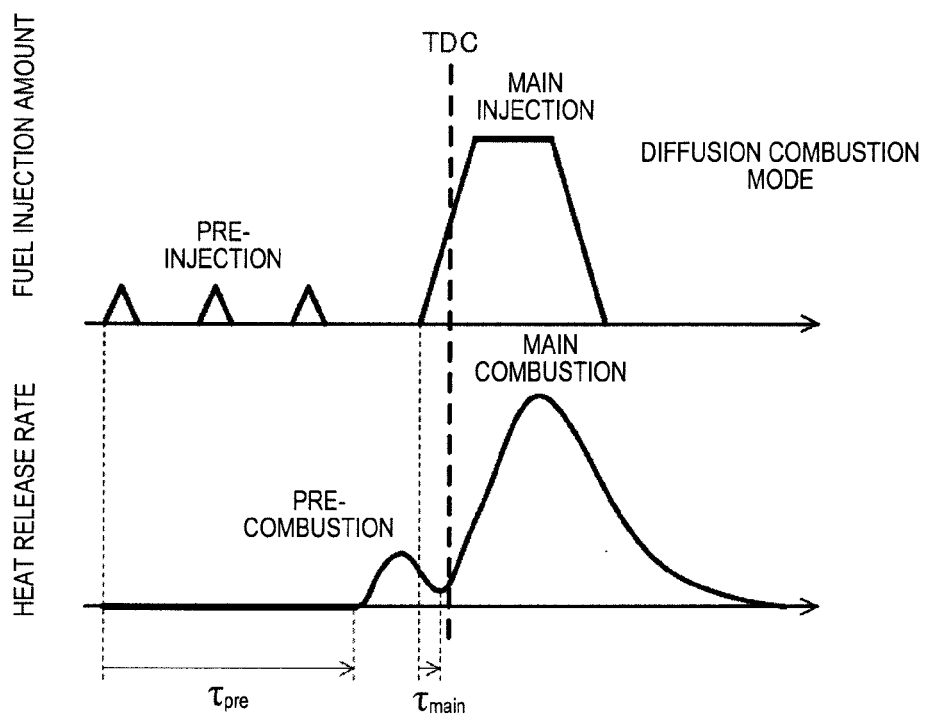
FIG. 3B is chart showing an example of the fuel injection mode in a diffusion combustion mode and an example of the history of the heat release rate associated with the injection mode.

FIGS. 3A and 3B show the fuel injection modes (upper parts of each charts) of the two combustion modes executed by the engine 1 and examples of history (lower parts of each charts) of the heat release rate within the cylinder 11*a* associated with the fuel injection modes. FIG. 3A shows the premix combustion mode and FIG. 3B shows the diffusion combustion mode. Note that the fuel injection amounts and the heat release rates shown in FIGS. 3A and 3B do not necessarily show relative fuel injection amounts nor relative heat release rates as these charts are mutually compared. In this diesel engine 1, it will be in the premix combustion mode within a range where the engine load is relatively low and, on the other hand, it will be in the diffusion combustion mode within a range where the engine load is relatively high.

FIG. 3A shows, as described above, the fuel injection modes (the upper part of the chart) in the premix combustion mode and an example of the history (the lower part of the chart) of the heat release rate within the cylinder 11*a* associated with the fuel injection modes. In the premix combustion mode, fuel injections are executed three times at a predetermined time interval during the compression stroke (before a top dead center of the compression stroke). The three fuel injections are executed at timings where all the fuel injected by each injection reaches in the cavity. Note that the number of fuel injections in the premix combustion mode range is not limited to three but may be set suitably. The fuel thus injected combusts by self-ignition at or near a top dead center of the compression stroke in a state where it is fully mixed with air. Such a premix combustion mode is advantageous for the fuel consumption and the exhaust emission within a range where the engine load and the engine speed are low.

In the diffusion combustion mode, as shown in FIG. 3B, the PCM 10 executes three pre-injections (pre-stage injection) at a comparatively short interval at timings comparatively near the top dead center of the compression stroke, and executes the main injection once at or near the top dead center of the compression stroke following the pre-injections. That is, a total of four fuel injections are executed. Since the engine 1 has a low compression ratio, the temperature and pressure at the end of the compression stroke become comparatively low, and the ignition delay tends to be long also in the diffusion combustion mode where the engine load is relatively high. When the ignition delay becomes long, the slope of the heat release rate of the main combustion where the diffusion combustion is mainly caused becomes steep, the combustion sound becomes large, and the NVH performance drops. Therefore, the engine 1 performs characteristic pre-combustion before the main combustion in order to shorten such an ignition delay. That is, the execution of three pre-injections causes the pre-combustion (corresponding to the pre-stage combustion) having a sufficient heat release rate so that a peak of the heat release rate occurs at a predetermined timing before the top dead center of the compression stroke. This increases the temperature and pressure within the cylinder 11a before the top dead center of the compression stroke at which the main injection is executed. Then, when the main injection is executed at or near the top dead center of the compression stroke (particularly, immediately before the top dead center of the compression stroke), the main combustion starts at or near the top dead center of the compression stroke along with a short ignition delay $\tau_{main}$. Here, in the example of FIG. 3B, the ignition delay $\tau_{main}$ of the main combustion is defined as a time period from the start of the main injection until the heat release rate of the main combustion starts increasing. In this control, the injection mode of the pre-injection and the injection mode of the main injection are set so that the heat release rate due to the pre-combustion reaches a peak and the heat release rate then begins to fall and, after that, the rise of the heat release rate due to the main combustion begins. A local minimum exists between the peak of the heat release rate of the pre-combustion and the peak of the heat release rate of the main combustion. The ignition delay $\tau_{main}$ of the main combustion may be defined as a time period from the start of the main injection to the local minimum.

By the pre-combustion securely increasing the cylinder internal temperature and pressure before the main injection, the ignition delay $\tau_{main}$ of the main combustion can be shortened and the main combustion can be caused at a desirable timing. Moreover, the rise of the heat release rate of the main combustion becomes slower by shortening the ignition delay $\tau_{main}$. Thus, the avoidance of the sudden rise of the heat release rate is advantageous for lowering the combustion sound and improving the NVH performance.

Figure 8:
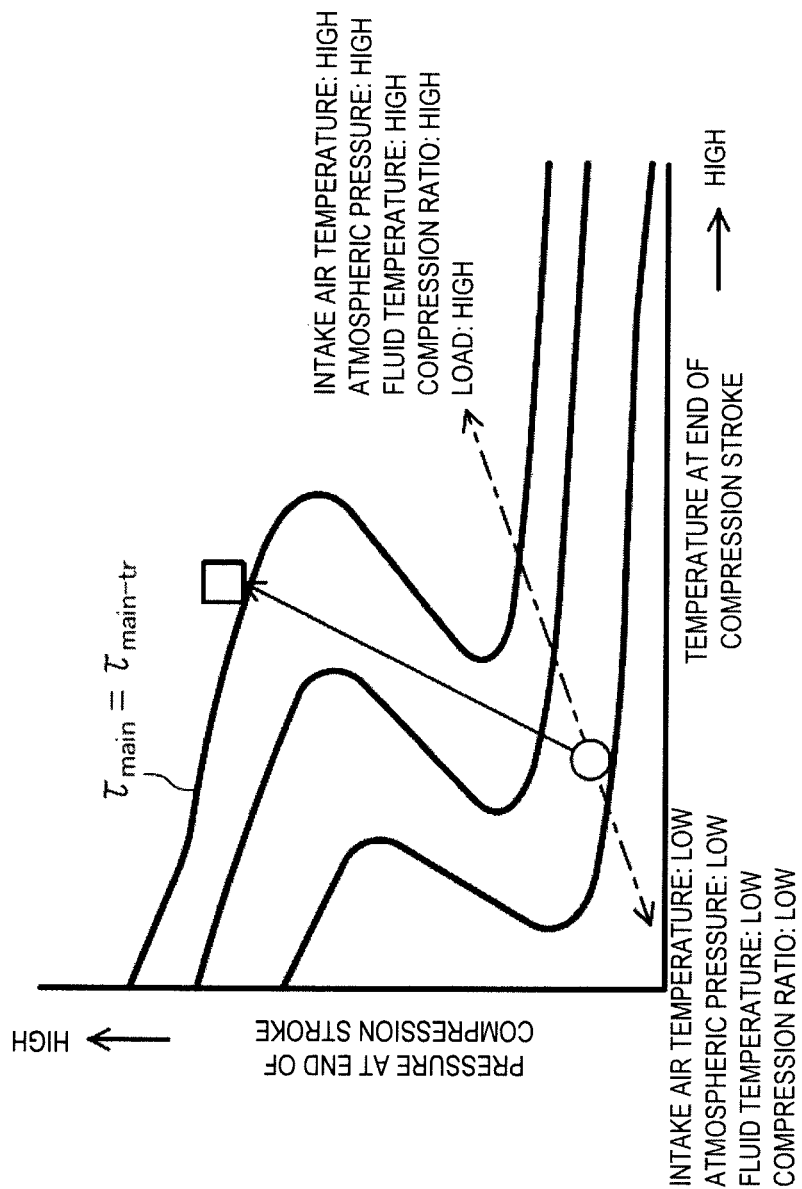
FIG. 8 is a contour diagram according to the ignition delay showing an example of a change in a state within the cylinder in the diffusion combustion mode.

Here, a relation of the ignition delay between the pre-combustion and the main combustion is described referring to the accompanying drawings. Although the details will be described later, an analysis simulation is carried out for the compression ignition (particularly, a low-temperature compression self-ignition) phenomenon within the cylinder 11a by using chemical reaction simulation software. FIG. 8 shows an example of the contour diagram containing the isochronal lines obtained based on the simulation result by connecting the temperature-and-pressure relations where the ignition delay is constant on the temperature-pressure plane. In the diagram, the vertical axis is set to a cylinder internal pressure (particularly, a pressure at the end of the compression stroke) and the horizontal axis is set to a cylinder internal temperature (particularly, a temperature at the end of the compression stroke). In the contour diagram, the isochronal line is located to the right and downward as the ignition delay becomes shorter. Moreover, each isochronal line in the contour diagram changes its location according to the change in the local equivalence ratio φ. Specifically, the isochronal line is located to the right and upward as the local equivalence ratio is lower, thereby a range on the left side of and below the isochronal line becomes larger. On the other hand, the isochronal line is located to the left and downward as the local equivalence ratio is higher, thereby a range on the left side of and below the isochronal line becomes smaller.

For example, in the contour diagram of FIG. 8, if it is assumed that the highest and rightmost isochronal line is 0.2 msec, when the cylinder internal temperature-and-pressure relation is in a range on the right of and above the isochronal line of 0.2 msec (for example, at a white square in FIG. 8), the ignition delay becomes shorter than 0.2 msec. On the other hand, when the cylinder internal temperature-and-pressure relation is in a range on the left side of and below the isochronal line, the ignition delay will be longer than 0.2 msec.

A state shown by a white circle in FIG. 8 shows an example of the temperature at the end of the compression stroke and the pressure at the end of the compression stroke when not performing the pre-combustion. This corresponds to the temperature and pressure at the end of the compression stroke at the time of motoring. This white circle is located at a comparatively lower left position in FIG. 8 resulting from the engine 1 being constructed at the comparatively low geometric compression ratio of 12:1 to 15:1, and this corresponds to the state where the ignition delay is comparatively long. This increases the combustion sound of the main combustion and reduces the NVH performance.

For this reason, in order to shorten the ignition delay of the fuel injected by the main injection and to improve the controllability and NVH performance of the main combustion, the temperature-and-pressure relation within the cylinder 11a at the time of starting the main injection has to be in a range on the right of and above the isochronal line, for example, of 0.2 msec, as shown by the white square in FIG. 8.

The pre-combustion is to shift the state from the white circle in FIG. 8 to the white square in connection with increasing the temperature and pressure within the cylinder 11a. In other words, the pre-combustion is to cause the state to cross the isochronal line so that, as shown by a solid-line arrow in FIG. 8, the cylinder internal state is shifted from a range on the left of and below a desirable isochronal line to a range on the right of and above the isochronal line. The length of the arrow in FIG. 8 corresponds to a quantity of heat generated by the pre-combustion. According to such pre-combustion, the ignition delay $\tau_{main}$ of the main combustion is preferably set to 0.1 to 0.3 msec. The ignition delay longer than 0.3 msec makes the slope of the heat release rate of the main combustion steep and causes the fall of the NVH performance. On the other hand, the ignition delay shorter than 0.1 msec degrades the penetration of the atomized fuel, worsens the formation of the air-fuel mixture, and reduces the exhaust performance.

Here, the temperature and pressure at the end of the compression stroke at the time of motoring change with environmental conditions according to the operation of the engine 1, such as the intake air temperature, an atmospheric pressure (or an intake air pressure), the engine water temperature, an effective compression ratio, the engine load, without depending only on the geometric compression ratio described above. Specifically, the temperature and pressure at the end of the compression stroke at the time of motoring (the white circle in FIG. 8) are located to the right and upward as the intake air temperature is higher, as the atmospheric pressure (or the air intake pressure) is higher, as the engine water temperature is higher, as the effective compression ratio is higher, or as the engine load is higher. On the other hand, the temperature and pressure at the end of the compression stroke (the white circle in FIG. 8) at the time of motoring are located to the left and downward as the intake air temperature is lower, as the atmospheric pressure (or the air intake pressure) is lower, as the engine water temperature is lower, as the effective compression ratio is lower, or as the engine load is lower. Therefore, as the temperature and pressure at the end of the compression stroke are located more to the left and downward, a distance from the isochronal line increases to degrade the ignitability and, as a result, the quantity of heat required for the pre-combustion increases.

Performing the pre-injection in three steps increases the ignitability of the fuel injected by the pre-injection, thereby improving the controllability of the pre-combustion. That is, the total injection amount of the pre-injection is determined by a quantity of heat to be generated by the pre-combustion. If the required total injection amount is supplied into the cylinder 11a by a single pre-injection, the fuel will be spread at a stretch to reduce the equivalence ratio of the air-fuel mixture. As a result, the ignition delay $\tau_{pre}$ of the pre-combustion will be long (refer to the lower part of FIG. 3B). On the other hand, by performing the pre-injection in three steps dividing the required total injection amount in three, the injection amount per pre-injection is reduced. Thus, by injecting a small amount of the fuel intermittently, the diffusion of the fuel is suppressed and the air-fuel mixture with a high equivalence ratio (for example, the equivalence ratio is 1 to 3) is created locally. In this way, the ignition delay $\tau_{pre}$ of the pre-combustion can be shortened by creating the air-fuel mixture with a high equivalence ratio. When the ignition delay $\tau_{pre}$ of the pre-combustion becomes short, the timing of the pre-combustion can be controlled with sufficient accuracy. That is, the pre-combustion can be controlled so that a peak of the heat release rate is generated with sufficient accuracy at a predetermined timing before a top dead center of the compression stroke as described above. This leads to stably starting of the main combustion at the predetermined timing. The ignition delay $\tau_{pre}$ of the pre-combustion is preferably set to 1.5 msec or less. Accordingly, the generation of the peak of the heat release rate of the pre-combustion before a top dead center of the compression stroke is more certain and it becomes advantageous for improving the controllability of the main combustion.

Figure 9C:
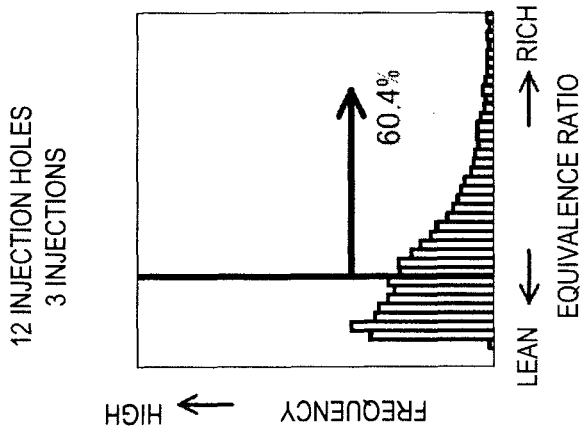
FIGS. 9A to 9C show frequency distributions of a local equivalence ratio within the cylinder when the injection mode is different, where
Figure 9B:
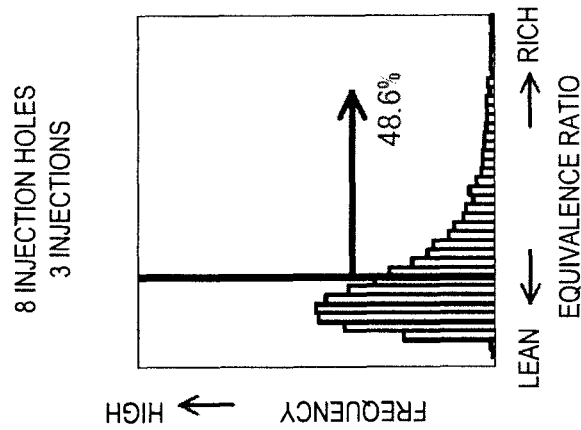
Figure 9A:
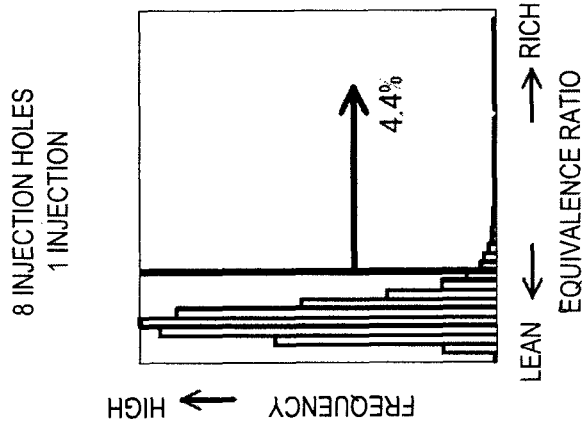

FIGS. 9A to 9C show frequency distributions of the local equivalence ratio within the cylinder 11a of different injection modes. FIG. 9A shows the frequency distribution of the local equivalence ratio when injecting the fuel only once from the injector 18 having eight injection holes, and its frequency where the local equivalence ratio φ becomes one or above is as low as 4.4%. In this case, since the ignitability is bad, the ignition delay becomes long. Moreover, in order to obtain a desirable quantity of heat by the pre-combustion, the fuel injection amount has to be increased due to the degradation of the ignitability.

On the other hand, FIG. 9B shows the frequency distribution of the local equivalence ratio in a case where the injections are performed three times from the injector with eight injection holes. The frequency where the local equivalence ratio φ became one or above is 48.6%, and the ignitability is improved by increasing the number of injections. That is, since the fuel amount per injection is reduced and the fuel is injected intermittently, it would appear that atomized fuel injected later comes to collide with atomized fuel injected previously and the equivalence ratio becomes locally high.

Moreover, FIG. 9C shows the frequency distribution of the local equivalence ratio in a case where the number of injection holes of the injector 18 is increased to twelve and the number of injections is three. In this case, the frequency where the local equivalence ratio φ becomes one or above is 60.4%, and the ignitability improves also by increasing the number of injection holes.

As described above, in terms of increasing the controllability of the pre-combustion to raise the local equivalence ratio by the pre-injection, it will also be expected that, although a greater number of injections is more advantageous, if the number of injections are too many, the equivalence ratio does not increase so much because one injection is not separated from another injection with a sufficient interval therebetween. Therefore, the number of injections in the pre-injection is preferably set to about three at most. Note that the number of injections in the pre-injection may be reduced in an advantageous condition to the ignitability, for example, where the engine load increases. Moreover, it is more advantageous for increasing the controllability of the pre-combustion if a greater number of injection holes are provided because the local equivalence ratio by the pre-injection is increased. However, if the number of injection holes is increased, since the hole size will be reduced, the outreach of the atomized fuel becomes shorter. Therefore, about eight to twelve are suitable for the number of injection holes of each injector 18.

Such two or more pre-injections are executed at timings such that all atomized fuel by each of the pre-injections reaches in the cavity 14a (i.e., in the combustion chamber). This includes both a case where the atomized fuel injected from the injector 18 enters directly into the cavity while the piston 14 is elevating toward a top dead center of the compression stroke, and a case where, even if the atomized fuel injected from the injector 18 hits the lip portion or the like of the cavity and leaks outside the cavity but, after that, when the piston 14 elevates near a top dead center of the compression stroke, the leaked atomized fuel then enters into the cavity. Thereby, all the air-fuel mixture with a high equivalence ratio created locally is settled within the cavity, the ignition delay $\tau_{pre}$ of the pre-combustion is further shortened, and the controllability of the pre-combustion is further increased.

In the diffusion combustion mode, the peak of the pre-combustion is shifted before the start of the rise of the peak of the main combustion. Therefore, the temperature and pressure within the cylinder 11a can be raised at the start of combustion up to a sufficient state for shortening the ignition delay by the energy obtained from the pre-combustion while avoiding that the combustion sound of the main combustion becomes large. This shortens the ignition delay of the main combustion, as well as it reduces the injection amount of the pre-injection to the minimum. Therefore, it advantageously improves the fuel consumption.

The diesel engine 1 has a feature of expanding the range where the premix combustion mode is executed to a higher load side than the conventional engine. This is described referring to the accompanying drawings.

Figure 4A:
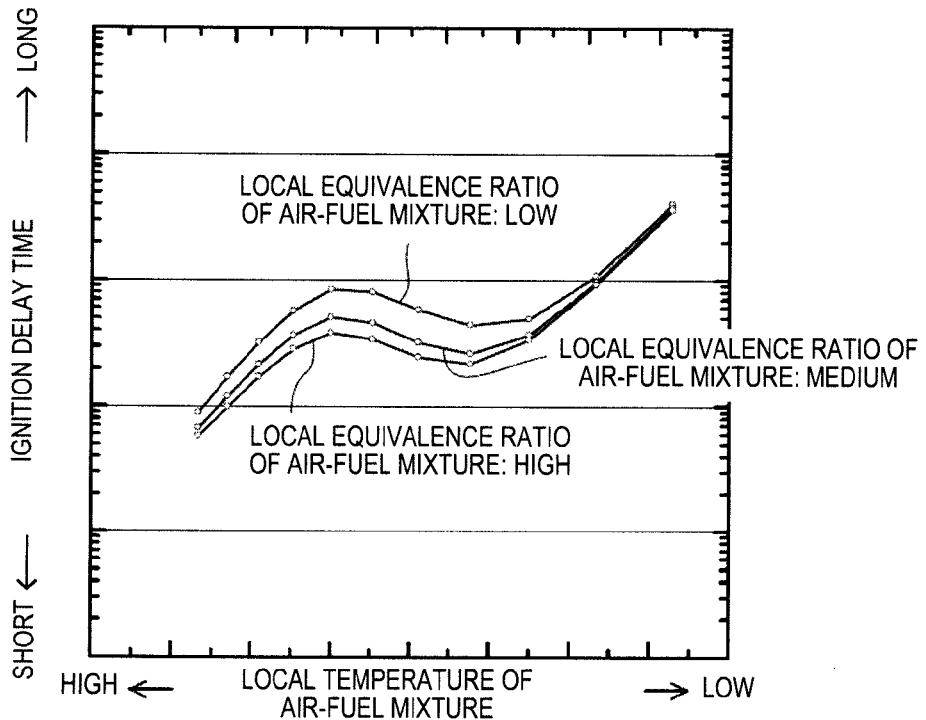
FIG. 4A is a graph showing an example of a relation of an ignition delay with respect to a local temperature when changing a local equivalence ratio.
Figure 4B:
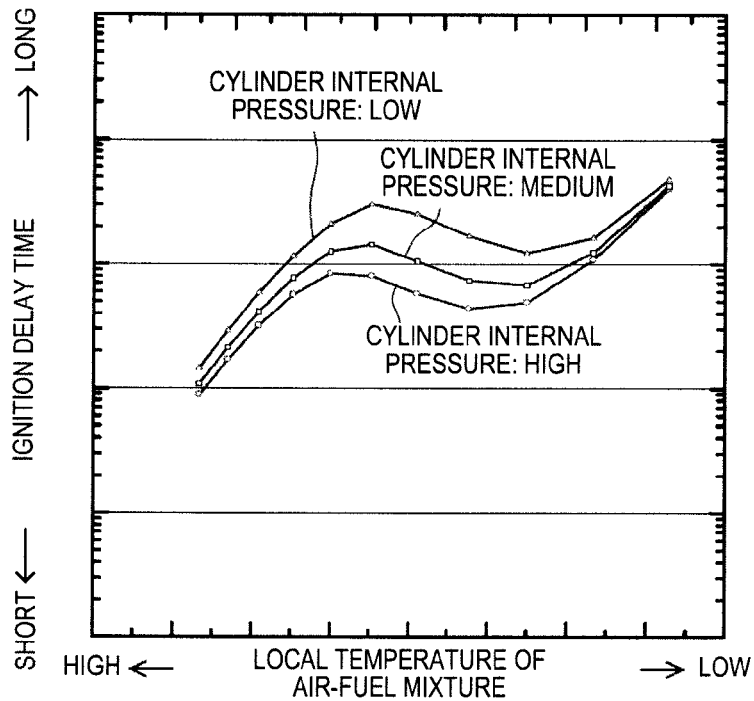
FIG. 4B is a graph showing an example of the relation of the ignition delay with respect to the local temperature when changing a cylinder internal pressure.

FIGS. 4A and 4B show an example of the simulation result obtained by analyzing the compression ignition (low-temperature compression self-ignition) phenomenon within the cylinder by using the chemical reaction simulation software. FIG. 4A shows a relation of the change in the ignition delay with respect to the change in the local temperature of the air-fuel mixture when changing the local equivalence ratio φ of the air-fuel mixture into Low (φ=1.0), Medium (φ=2.0), and High (φ=3.0), respectively, at a predetermined cylinder internal pressure (for example, 4 MPa). The local temperature range plotted in FIG. 4A corresponds to 700-1200K. According to this, the ignition delay becomes longer as the local equivalence ratio is lower, and the ignition delay becomes shorter as the local equivalence ratio is higher. Moreover, fundamentally, if the local equivalence ratio is fixed, the ignition delay will be shorter as the local temperature is higher (toward the left-hand side of the plot), while the ignition delay will be longer as the local temperature is lower (toward the right-hand side of the plot). However, the ignition delay does not change uniformly against the change in the local temperature and, a temperature zone where the ignition delay once becomes longer when the local temperature is changed from a low temperature side to a high temperature side exists.

Moreover, FIG. 4B shows a relation of the change in the ignition delay with respect to the change in the local temperature when changing the cylinder internal pressure P to Low (P=2 MPa), Medium (P=3 MPa), and High (P=4 MPa), respectively, at the predetermined local equivalence ratio (φ=1.0). The local temperature range plotted in FIG. 4B also corresponds to 700-1200K. According to this, the ignition delay becomes longer as the cylinder internal pressure is lower, and the ignition delay becomes shorter as the cylinder internal pressure is higher. Moreover, fundamentally, if the cylinder internal pressure is fixed, the ignition delay will be shorter as the local temperature is higher (toward the left-hand side of the plot), and the ignition delay will be longer as the local temperature is lower (toward the right-hand side of the plot). However, the ignition delay does not change uniformly with respect to the change in the local temperature, and a temperature zone where the ignition delay once becomes longer when changing the local temperature from the low temperature side to the high temperature side exists.

Thus, the reason why the ignition delay does not change uniformly with respect to the change in the local temperature of the air-fuel mixture can be considered as follows. That is, in the low-temperature compression self-ignition, a temperature range where a "hot flame" associated with generation of heat and a low-temperature flame called a "cool flame" before the hot flame develop and the cool flame reaction becomes active exists. That is, in the temperature range where the cool flame reaction becomes active, the cool flame reaction continues for a long period of time and, after that, the hot flame reaction develops. Therefore, a time until the hot flame reaction develops will be long, and in other words, the ignition delay within the cylinder will be longer.

Figure 5:
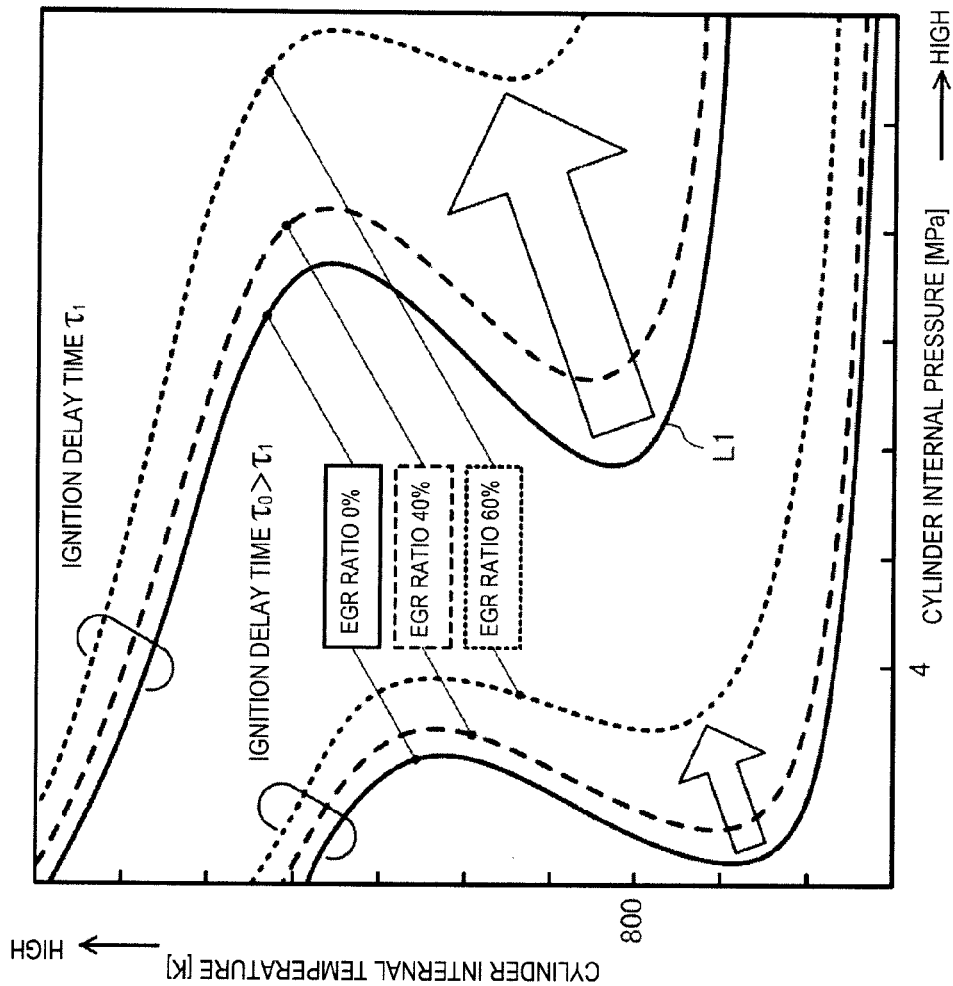
FIG. 5 shows an example of a contour diagram showing the ignition delay on a temperature-pressure plane where a cylinder internal temperature and a cylinder internal pressure are used as parameters, and is a graph showing a change of an isochronal line when changing an EGR ratio.

Based on such a simulation result illustrated in FIGS. 4A and 4B, it is possible to create the contour diagram containing the isochronal lines obtained by connecting the temperature-and-pressure relations where the ignition delay is constant, on the temperature-pressure plane where the vertical axis is set to the cylinder internal temperature and the horizontal axis is set to the cylinder internal pressure. The contour diagram is illustrated in FIG. 5. In this diagram, three isochronal lines relatively located in the upper right correspond to the ignition delay $\tau$ of $\tau_1=0.2$ msec, and the three isochronal lines relatively located in the lower left correspond to the ignition delay $\tau$ of $\tau_0=1.5$ msec. In order to achieve the premix combustion by securing a comparatively long ignition delay, the cylinder internal temperature-and-pressure relation needs to be located on the left of and below the isochronal line corresponding to the long ignition delay. However, the isochronal line is located more to the left and downward in the contour diagram as the ignition delay becomes longer and, thereby the range on the left of and below the isochronal line becomes narrower. This corresponds to that the operating range where the premix combustion mode can be executed is limited to a part of the low-load side.

Here, the factor which determines the ignition delay of the fuel injected into the cylinder 11a includes the cylinder internal $O_2$ concentration, as well as the cylinder internal temperature and pressure. That is, the ignition delay becomes shorter as the cylinder internal $O_2$ concentration becomes higher and, on the other hand, the ignition delay becomes longer as the cylinder internal $O_2$ concentration becomes lower. FIG. 5 shows the change in the position of the isochronal line when the cylinder internal $O_2$ concentration is changed by changing the EGR ratio. Here, the EGR ratio (%) is defined as follows:

EGR ratio(%)=mass of EGR gas(g)/(mass of fresh air(g)+mass of EGR gas(g)).

In the engine 1, it is calculated based on the $CO_2$ concentration on the intake side and the $CO_2$ concentration on the exhaust side as follows:

EGR ratio(%)=($CO_2$ concentration in intake passage (%)−$CO_2$ concentration in atmosphere(%))/($CO_2$ concentration in exhaust gas(%)−$CO_2$ concentration in atmosphere(%)).

The EGR ratio is set to 40% and, when the cylinder internal $O_2$ concentration is lowered below the $O_2$ concentration at the time of the EGR ratio being 0%, the isochronal line moves to the right and upward from a solid line to a dashed line. Similarly, the EGR ratio is set to 60% and, when the cylinder internal $O_2$ concentration is further lowered below the $O_2$ concentration at the time of the EGR ratio being 40%, the isochronal line further moves to the right and upward from the dashed line to a dotted line. The EGR gas which contains $CO_2$ and $H_2O$ having a relatively large molecular weight is introduced into the cylinder 11a to increase the heat capacity of the gas within the cylinder 11a to suppress the temperature increase and, it would appear that this lengthens the ignition delay of the fuel, that is, moves the isochronal line to the right and upward.

Thus, since moving the isochronal line to the right and upward expands the range on the left of and below the isochronal line corresponding to the amount of movement of the isochronal line, the ignition delay is lengthened and it becomes advantageous for performing the premix combustion. That is, even if the cylinder internal temperature and the pressure increase with the rise of the load of the engine 1, the state comes to be located on the left of and below the isochronal line to enable the premix combustion, thereby expanding the operating range where the premix combustion is possible to a higher load side.

From the above-described knowledge based on the contour diagram according to the ignition delay, the operating range where the premix combustion mode is executed is expanded to the higher load side in the diesel engine 1 by differentiating the adjustment control of the EGR ratio from the conventional device. Specifically, by the adjustment of the openings of the exhaust gas recirculation valve 51a, the L/P EGR valve 54a and the like based on the detection signals from the intake $CO_2$ sensor SW6 and the exhaust $CO_2$ sensor SW7 and the like, as shown in the part (a) of FIG. 6, when changing the engine load from a low-load side to a high load side, the change characteristic of the EGR ratio with respect to the engine load is made so that the EGR ratio is substantially constant up to a predetermined load and, above the predetermined load, the characteristic is made so as to linearly reduce the EGR ratio with the increase in the engine load. Note that, although illustration is omitted, the EGR ratio may be slightly reduced up to the predetermined load.

Figure 6A:
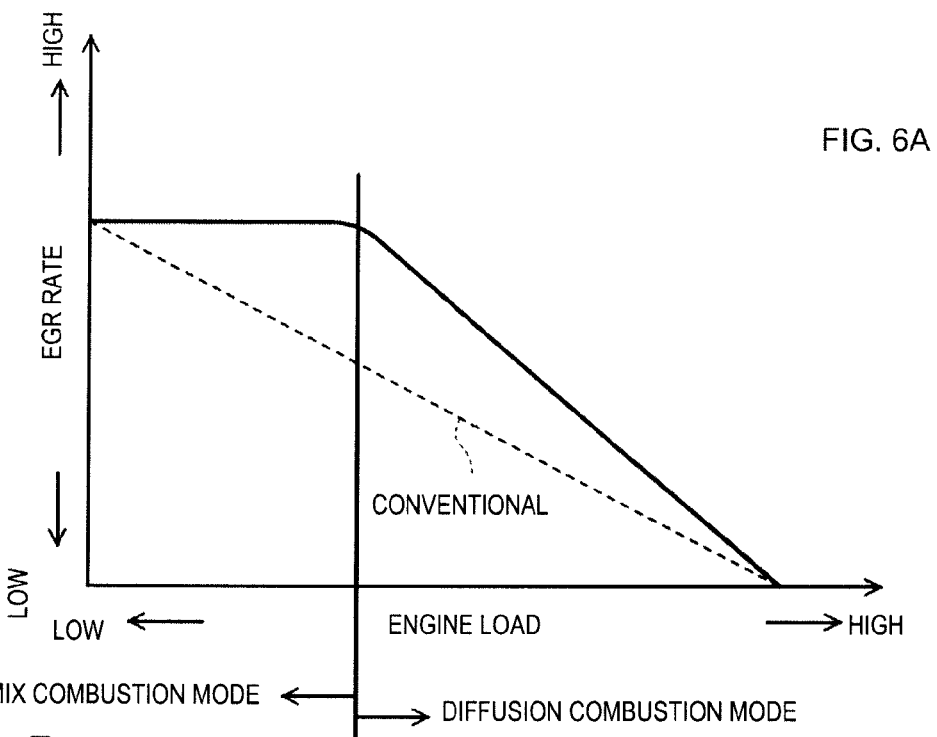
FIG. 6 shows in the part (a) an example of a control characteristic diagram of the EGR ratio with respect to an engine load, in the part (b) an example of a change characteristic diagram of a cylinder internal $O_2$ concentration with respect to the engine load.
Figure 6B:
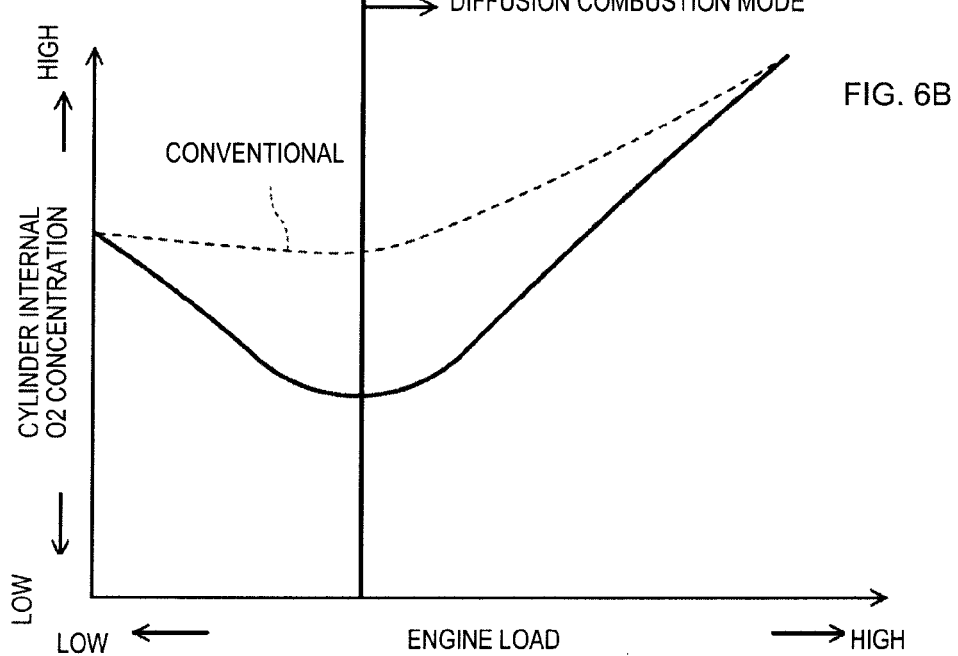

As for the conventional device, the change characteristic of the EGR ratio with respect to the engine load is set according to the increase in the engine load so as to linearly reduce the EGR ratio as shown by a dashed line in the part (a) of FIG. 6. This is for meeting a torque requirement associated with the increase in the engine load. With such a change characteristic of the EGR ratio, the $O_2$ concentration within the cylinder 11a has a characteristic as shown by a dashed line in the part (b) of FIG. 6. Here, the change characteristic of the $O_2$ concentration is such that the $O_2$ concentration in an extremely light load becomes slightly higher than the $O_2$ concentration when the load increases slightly above the extremely light load. This is resulted from the $O_2$ concentration in the exhaust gas becoming high in the diesel engine 1, which does not perform throttling, at the time of the extremely light load with a very small fuel injection amount.

On the other hand, in the engine 1 of this embodiment, as shown by the solid line in the part (a) of FIG. 6, the EGR ratio is increased more than the conventional device at a low load or a middle load. Thereby, as shown by a solid line in the part (b) of FIG. 6, the cylinder internal $O_2$ concentration is reduced more than the conventional device at a predetermined engine load (within a load range corresponding to the low load and the middle load when the load range of the engine is divided into three of High, Middle, and Low).

Figure 7:
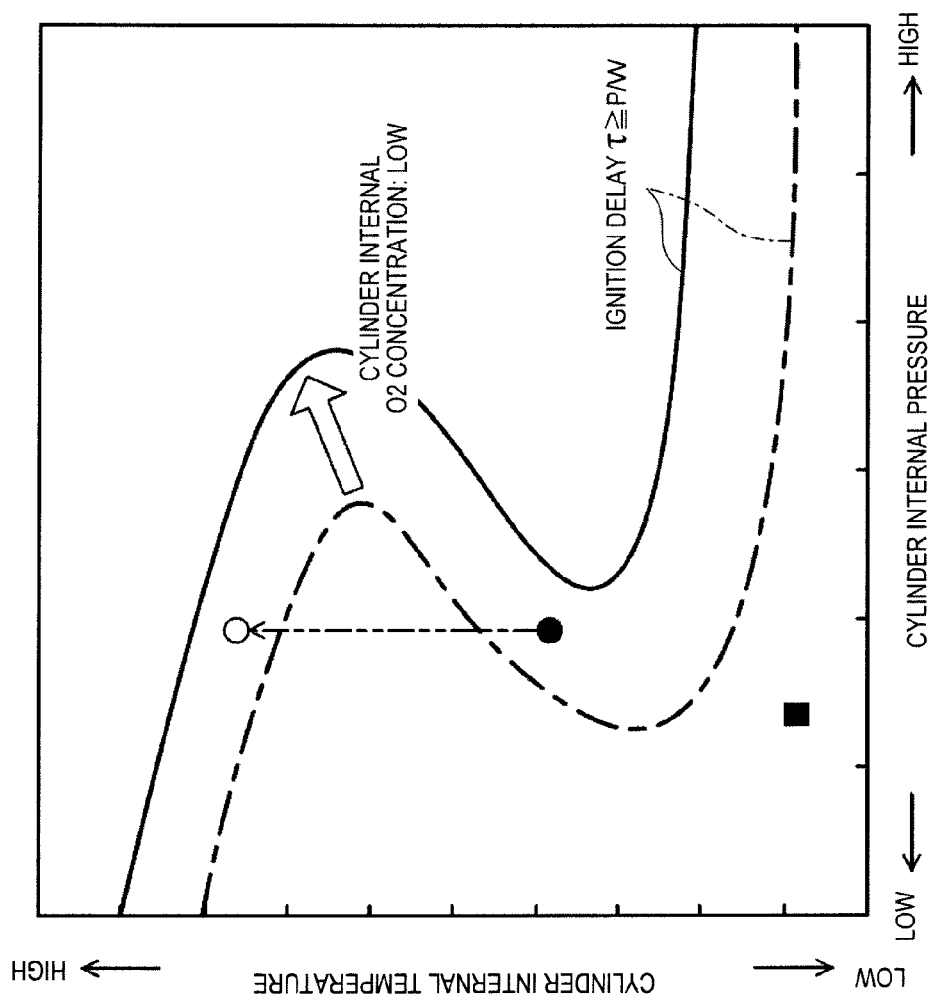
FIG. 7 is a diagram illustrating on the contour diagram a specific control executed by a control device of the diesel engine.

By such a control, as shown in FIG. 7, the isochronal line, which is conventionally located at a position shown by a chain line, is now possible to be moved to the right and upward up to the position of the solid line. Here, the ignition delay τ corresponding to the isochronal line is determined according to the fuel injection period P/W set according to the operating state of the engine 1, and is set to τ>P/W. Note that, as for a single injection in which the number of the pre-injections is one, it may be set so that τ=P/W, or may be τ>P/W with some margin. Moreover, the injection period P/W may be set according to various factors, such as the total injection amount, the number of injections (number of injection stages), and the advance limit up on the injected fuel reaches in the cavity (it is related to geometries such as an injecting direction of the injector 18, the shape of the cavity, etc.). Therefore, for example, in the state shown by a black circle in FIG. 7, the premix combustion is impossible by the conventional control (the isochronal line of the chain line) because it is located on the right side of the isochronal line; however, the isochronal line moves to a location of the solid line to locate the state on the left side of the isochronal line, thereby the premix combustion is now possible.

In addition, as shown in FIG. 6, the relatively low-load operating range including the load range where the $O_2$ concentration within the cylinder 11a becomes the lowest by the particular adjustment control of the EGR ratio is set to the premix combustion mode, and the operating range of a higher load side than the premix combustion mode is set to the diffusion combustion mode.

Here, up on the adjustment of the EGR ratio which expands the range of the premix combustion mode as described above, either one of the external EGR control or the internal EGR control may be used. However, the external EGR control may be preferable. The EGR gas is particularly preferable to be recirculated to the intake system through the control of the low-pressure EGR system among the high-pressure EGR system (particularly, the cooler bypass passage 53 and the cooler bypass valve 53a) and the low-pressure EGR system (the exhaust gas recirculating passage 54 and the L/P EGR valve 54a). This is because the low-pressure EGR system is located downstream of the large-sized and small-sized turbines 61b and 62b and, in addition, the temperature of exhaust gas is relatively low in order to branch the exhaust gas at a location downstream of the filter 41b. Further, since the EGR gas which recirculates to the intake passage 30 by the low-pressure EGR system is cooled by both the EGR cooler 54b and the intercooler 35, the temperature increase within the cylinder can be suppressed. That is, even if the range of the premix combustion mode is expanded by the adjustment of the EGR ratio, when recirculating hot EGR gas to the intake passage 30, the cylinder internal temperature rises and, in connection with this, as shown by a white circle in FIG. 7, the cylinder internal temperature and pressure state may be located near the moved isochronal line. In this case, it becomes difficult to stably perform the premix combustion. For this reason, in order to expand the range of the premix combustion mode to stably perform the premix combustion, the EGR gas is preferable to be recirculated to the intake passage 30 by the low-pressure EGR system so that the increase in the cylinder internal temperature is suppressed and the cylinder internal state separates from the isochronal line. Note that the EGR gas cooled by the EGR cooler 52 in the main passage 51 in the high-pressure EGR system may be recirculated to the intake passage.

Note that, the control of the diesel engine 1 may be such that, for example, the contour diagrams shown in FIGS. 5 and 7 are stored in the PCM 10 as maps, the cylinder internal temperature-and-pressure relation (for example, the black square and the black circle in the contour diagram of FIG. 7) is estimated through the detections of various parameters, and the EGR ratio is set according to a relative position between the estimated state and the isochronal line. Alternatively, the control may be such that, without storing the contour diagrams as maps in the PCM 10, a model according to the ignition delay is stored in the PCM 10, the cylinder internal temperature and pressure state (the black square and the black circle) and the isochronal line is estimated based on the detections of various parameters and the model, respectively, and the EGR ratio is set according to the estimation. Further, it will be appreciated that the EGR ratio control system described herein is comprised of various components described above, including a portion of the powertrain control module 10, main passage 51, exhaust gas recirculation valve 51a, cooler bypass passage 53, cooler bypass valve 53a, low pressure L/P EGR valve 54, VVM 71.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

| EXPLANATION OF REFERENCE CHARACTERS | |
| --- | --- |
| 1 | Diesel engine (engine unit) |
| 10 | Powertrain control module |
| | (injection control module and EGR ratio control system) |
| 11a | Cylinders |
| 18 | Injectors (fuel injection valves) |
| 35 | Intercooler (cooled EGR device) |
| 50 | Exhaust gas recirculation passage (high pressure EGR system) |
| 51 | Main passage (EGR ratio control system) |
| 51a | Exhaust gas recirculation valve (EGR ratio control system) |
| 52 | EGR cooler (cooled EGR device) |
| 53 | Cooler bypass passage (EGR ratio control system) |
| 53a | Cooler bypass valve (EGR ratio control system) |
| 54 | Exhaust gas recirculation passage (low pressure EGR system) |
| 54a | Low pressure (L/P) EGR valve (EGR ratio control system) |
| 54b | EGR cooler (cooled EGR device) |
| 71 | Variable valve motion (VVM) (EGR ratio control system) |

The invention claimed is:

1. A diesel engine with control device, comprising:
an engine unit having a geometric compression ratio that is set to 15:1 or less, and that is configured to cause compression self ignition of fuel supplied into a cylinder;
a fuel injection valve arranged facing to an inside of the cylinder and for directly injecting the fuel into the cylinder;
an injection control module for controlling an injection mode of the fuel into the cylinder through the fuel injection valve; and
an EGR ratio control system for adjusting an $O_2$ concentration within the cylinder by adjusting an EGR ratio associated with an adjustment of an EGR gas volume introduced into the cylinder;
wherein the EGR ratio control system adjusts the EGR ratio according to a load of the engine unit so that the $O_2$ concentration within the cylinder decreases gradually with an increase in the load of the engine unit up to a predetermined load of the engine unit, and so that the $O_2$ concentration increases gradually above the predetermined load of the engine unit with an increase in the load of the engine unit past the predetermined load;

wherein the injection control module sets to a premix combustion mode where a fuel injection is terminated before a top dead center of a compression stroke in an operating range of a low load including the predetermined load where the $O_2$ concentration within the cylinder is lowest and, after that, the fuel ignites and combusts, while the injection control module sets to a diffusion combustion mode where the fuel injection is executed in parallel to the ignition and combustion of the fuel in an operating range where the load of the engine unit is higher than that of the operating range in the premix combustion mode and the $O_2$ concentration within the cylinder is relatively high;

wherein the injection control module executes in the diffusion combustion mode, a main injection for injecting the fuel to perform main combustion where diffusion combustion is mainly caused, and two or more pre-stage injections for injecting the fuel at a timing before the main injection to perform pre-stage combustion before the main combustion;

wherein the injection control module controls an injection mode of the pre-stage injections and an injection mode of the main injection so that a heat release rate due to the main combustion starts increasing after a heat release rate due to the pre-stage combustion reaches a peak and then begins to decrease; and wherein an operating range of a relatively low load, including the predetermined load where the $O_2$ concentration within the cylinder is lowest for an adjustment control of the EGR ratio, is set to the premix combustion mode, and the operating range of a higher load side than the premix combustion mode is set to the diffusion combustion mode.

2. A method of controlling a diesel engine, the engine having a geometric compression ratio set to 15:1 or less and the engine causing compression self ignition of fuel supplied into a cylinder, the method comprising:

adjusting an EGR ratio according to a load of the diesel engine so that an $O_2$ concentration within the cylinder decreases gradually with an increase in the load of the diesel engine up to a predetermined load of the diesel engine, and so that the $O_2$ concentration within the cylinder increases gradually above the predetermined load of the diesel engine with an increase in the load of the diesel engine;

operating the diesel engine in a premix combustion mode where a fuel injection is terminated before a top dead center of a compression stroke in an operating range of a low load including the predetermined load where the $O_2$ concentration within the cylinder is lowest and, after that, the fuel ignites and combusts; and operating in a diffusion combustion mode where the fuel injection is executed in parallel to the ignition and combustion of the fuel in an operating range where the load is higher than that of the operating range in the premix combustion mode and the $O_2$ concentration within the cylinder is relatively high;

wherein a main injection and a pre-stage injection are performed in the diffusion combustion mode so that main combustion where diffusion combustion is mainly caused and pre-stage combustion before the main combustion are performed; and wherein an injection mode of the pre-stage injection and an injection mode of the main injection are determined so that a heat release rate due to the main combustion starts increasing after a heat release rate due to the pre-stage combustion reaches a peak and the heat release rate then begins to decrease; and wherein an operating range of a relatively low load, including the predetermined load where the $O_2$ concentration within the cylinder is lowest for an adjustment control of the EGR ratio, is set to the premix combustion mode, and the operating range of a higher load side than the premix combustion mode is set to the diffusion combustion mode.

3. The method of claim 2, wherein the pre-stage injection is executed at a timing where the fuel injected for every injection reaches in a cavity of a top of a piston fitted in the cylinder.

* * * * *